(12) United States Patent
Levy

(10) Patent No.: US 6,204,615 B1
(45) Date of Patent: *Mar. 20, 2001

(54) INTELLIGENT OUTDOOR LIGHTING CONTROL SYSTEM

(75) Inventor: Josef Levy, Dallas, TX (US)

(73) Assignee: Intelilite, L.L.C., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/412,695

(22) Filed: Oct. 5, 1999

Related U.S. Application Data

(62) Division of application No. 08/804,714, filed on Feb. 21, 1997, now Pat. No. 5,962,991.

(51) Int. Cl.[7] .................................................. H02J 3/14
(52) U.S. Cl. ......................... 315/312; 315/318; 315/324; 307/36; 307/38
(58) Field of Search ..................... 315/292, 295, 315/312, 324, 360, 316, 318; 307/36, 38, 39, 40

(56) References Cited

U.S. PATENT DOCUMENTS

| | | | |
|---|---|---|---|
| 4,691,341 | * 9/1987 | Knoble et al. | ........................ 315/360 |
| 5,661,347 | * 8/1997 | Luger et al. | ............................ 307/39 |
| 5,677,603 | * 10/1997 | Speirs et al. | .......................... 315/324 |
| 5,936,362 | * 8/1999 | Alt et al. | ................................. 315/312 |
| 5,949,200 | * 9/1999 | Ference et al. | ....................... 315/295 |
| 5,962,991 | * 10/1999 | Levy | ..................................... 315/312 |

* cited by examiner

*Primary Examiner*—Don Wong
*Assistant Examiner*—Wilson Lee
(74) *Attorney, Agent, or Firm*—Haynes and Boone, LLP

(57) ABSTRACT

A new and improved outdoor lighting control system for an outdoor lighting system network for automatically sensing, conveying, and recording data relevant to the operation of the lighting system network so that both control and maintenance can be performed more efficiently. At each of plural lamp locations in the network, there is a controller module that receives electric power input and that supplies electric power to the remaining lamp locations. Each controller module has a first relay to deliver current to one or more outdoor illumination lamps at the controller module's location, and a second relay for switching electric power on to a succeeding lamp location. A first current sensor monitors current to the lamps at each lamp location, and a second current sensor monitors current to the remaining locations. The network's power lines form portions of a bi-directional data link via which data is transmitted from each controller module to a command station, and vice versa.

9 Claims, 8 Drawing Sheets

This covers the design of a lighting controller, based on a network of HID lamps and a computer to monitor their status. The controllers shall fit in a junction box at the base of the lights and turn on and off power to the lamps and to subsequent units. They shall communicate with a computer at least once a minute, but allowances will be made for an alarm mode. The controller functions are:

| Turn Lamp On |
|---|
| Turn Lamp Off |
| Turn Next Unit On |
| Turn Next Unit Off |
| Measure Lamp Current (Zero or very low upon burnout) |
| Measure Lamp Voltage |
| New Lamp/Ballast/Capacitor Installed |
| Send Alarm, shut down subsequent circuit if shorted |
| Measure Lamp Phase Angle? |

A computer software (typically in the electrical control room) will have the following functions:

| Log Time since Installation for each lamp, operating hours and days since installation |
|---|
| Log Alarm Events |
| Read Photocell Information |
| Turn on Lamps at particular times/Photocell Levels/in programmable sequence |
| Read Current/Voltage for each Lamp |
| Show which lamps are inoperable |
| Show High Pressure Sodium Lamps which cycle when turned on. |
| Turn back on Lamps in sequence to find a short/open |
| Emergency Dailout, short/open/lamp burnout |

*Fig. 7*

INTELLIGENT OUTDOOR LIGHTING CONTROL SYSTEM

This application is a division of Ser. No. 08/804,714, filed Feb. 21, 1997, now U.S. Pat. No. 5,962,991.

FIELD OF THE INVENTION

This invention relates generally to outdoor lighting control systems, and is especially advantageous for street and road lighting systems.

BACKGROUND AND SUMMARY OF THE INVENTION

Certain individuals and governments consider both ownership and use of motor vehicles as a social concession which is compensated and checked by the levying of duties and various taxes on the vehicles and on products used in conjunction with the motor vehicles, especially fuels. Ownership of motor vehicles is however increasing throughout the world, and this is at least to significant extent attributable to increased prosperity. As a result, there is increased demand for new infra-structure, such as new streets, roads, highways, expressways, parking lots, etc., to accommodate both the increasing number of motor vehicles and the presence of more luxurious vehicles. Existing infra-structure is often outdated and needs maintenance, upgrading, and/or replacement.

One important component of both existing and new infra-structure is lighting systems for streets, roads, highways, expressways, parking lots, etc. While lighting systems are primarily intended to be functional, in some traditional areas, such as airports and shopping malls, it is important that they have a decorative character. Decorative character of lighting systems is becoming more important especially where the lighting systems are in the presence of illuminated signage and lighted buildings. Increased cost per unit of land area will be accompanied by an increase in the amount of lighting cost per unit of land area. Infra-structure associated with streets, roads, highways, expressways, parking lots, etc. requires maintenance. Because of extensive daylight usage of these corridors of travel, maintenance is often performed at night. If daylight maintenance is performed, it often interferes with use of streets, roads, highways, expressways, parking lots, etc. Because of increased traffic volumes, higher speeds, etc., one can appreciate that performance of maintenance involves increased risks of accidental, and even fatal, harm to maintenance workers and to occupants of motor vehicles.

Therefore, there is an increasing need for lighting installations that are easier and more cost-effective to maintain. This is why sox catenary installations are becoming less popular while the less efficient conventional SON-T installations with 18 meter high light poles placed up to 80 meters apart are increasingly popular.

One general objective of the present invention is to provide a new and improved system for automatically sensing, conveying, and recording data relevant to the operation of a lighting system network so that maintenance can be performed more efficiently.

Another general objective of the present invention is to provide a new and improved system for automatically controlling the operation of a lighting system network more efficiently.

The present invention utilizes known electrical components organized and arranged in a lighting system in a way that has never been done before.

One general aspect of the invention relates to an outdoor lighting control system for a string of outdoor illumination lamps disposed at various locations along an outdoor lighting system comprising: for each of plural lamp locations in the string, a controller module comprising input means for receiving electric power input and output means for supplying electric power to the remainder of the string; each of said plural lamp locations further comprising one or more outdoor illumination lamps; each controller module comprising first switching means for switching the electric power input to deliver current to the one or more outdoor illumination lamps at the controller module's location, and second switching means for switching electric input power from the controller module's input means to the controller module's output means in response to receipt of electric power input at the controller module's input means.

The foregoing, and other features, along with various advantages and benefits of the invention, will be seen in the ensuing description which is accompanied by drawings. The drawings disclose a preferred embodiment of the invention according to the best mode contemplated at this time for carrying out the invention.

BRIEF DESCRIPTION OF THE DRAWINGS

FIG. 7 is a chart showing functions performed by a controller module in a lamp pole and functions performed by a control computer.

DESCRIPTION OF THE PREFERRED EMBODIMENT

Figure 1:
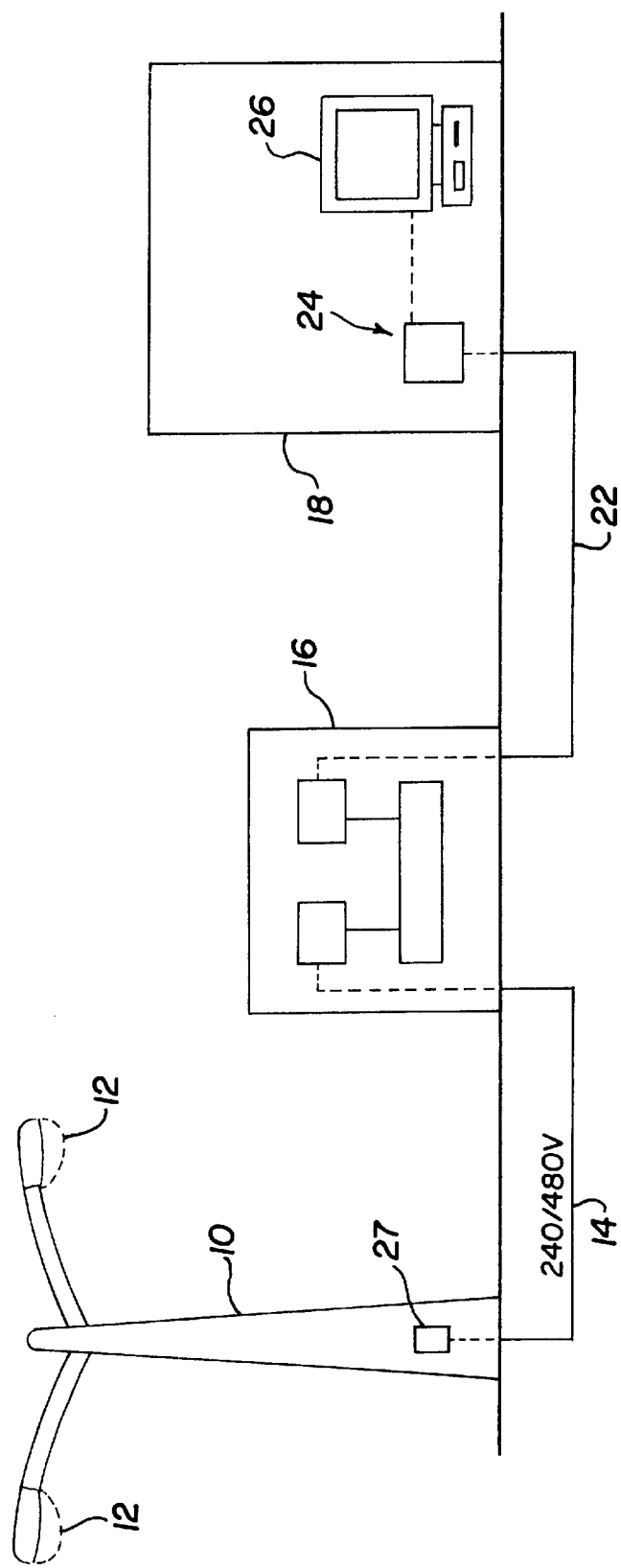
FIG. 1 is a view of a typical outdoor lighting system embodying principles of the invention.

FIG. 1 shows the general plan of a lighting system installation embodying principles of the present invention. There are a series of light poles 10 (only one pole being shown in FIG. 1), each of which has one or more lamps 12 for illuminating a land surface area. These poles are arranged in a string at appropriate distances, and in a given network there can be any number of strings and any number of poles in a string. Power (240/480 volts typically) is delivered to the poles via power lines 14, usually buried underground cables, and extending in a string from a lighting cabinet 16 that serves one or more strings in a network.

Figure 6:
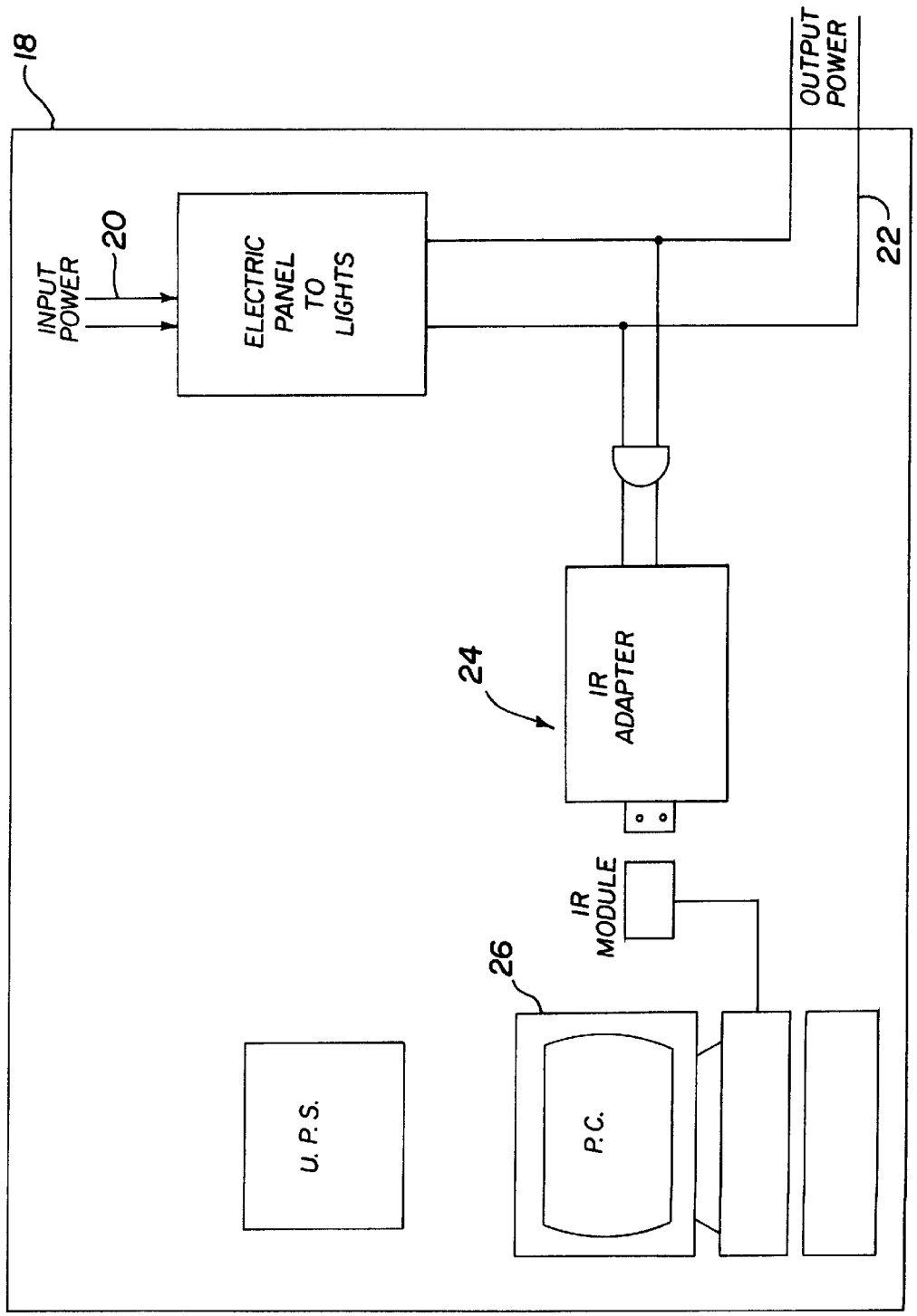
FIG. 6 is a diagram of a central control room.

A network may have various numbers of such lighting cabinets 16 that are linked with a central control room 18. Detail of an example of a central control room is shown in FIG. 6. Control room 18 receives electric power via incoming power lines 20 and delivers that power to the various lighting cabinets 16 via outgoing power lines 22. In addition, the power lines 14, 22 provide a means for bi-direction communication and control between the control room 18 on the one hand and the lighting cabinets 16 and controller modules 27 in each pole 10 on the other hand. Data from the lighting cabinets and controller modules is conveyed to the control room, and commands are conveyed from the control room to the lighting cabinets and controller modules.

The control room is adapted for automatic operation to turn various lamp strings and/or individual lamps on and off at various times and to collect data from the lighting cabinets and the lamps served from each cabinet. The illustrated control room has a communication link 24 to the outgoing power lines 22 which includes an IR module and adapter for linking a P.C. 26 with the outgoing power lines while providing electrical isolation between them.

Figure 2:
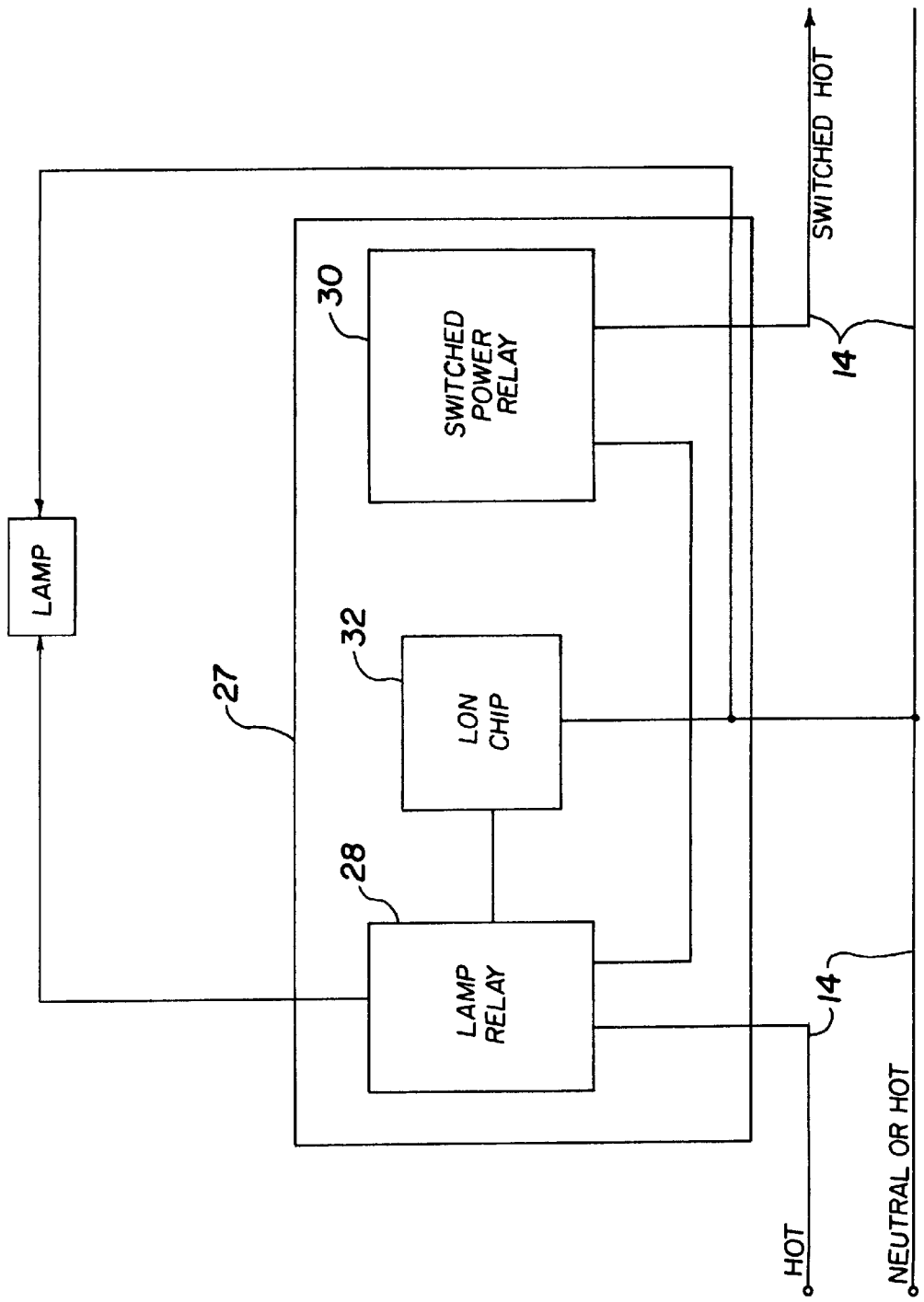
FIG. 2 is a block diagram of an installation at a lamp pole.

FIGS. 1 and 2 shows each pole 10 to comprise a controller module 27 that houses a lamp relay 28 via which electric power is delivered from power lines 14 to the pole's lamp or lamps. According to certain principles of the invention, a switched power relay 30 and a LON chip 32 are also provided within each controller module 27.

Figure 3:
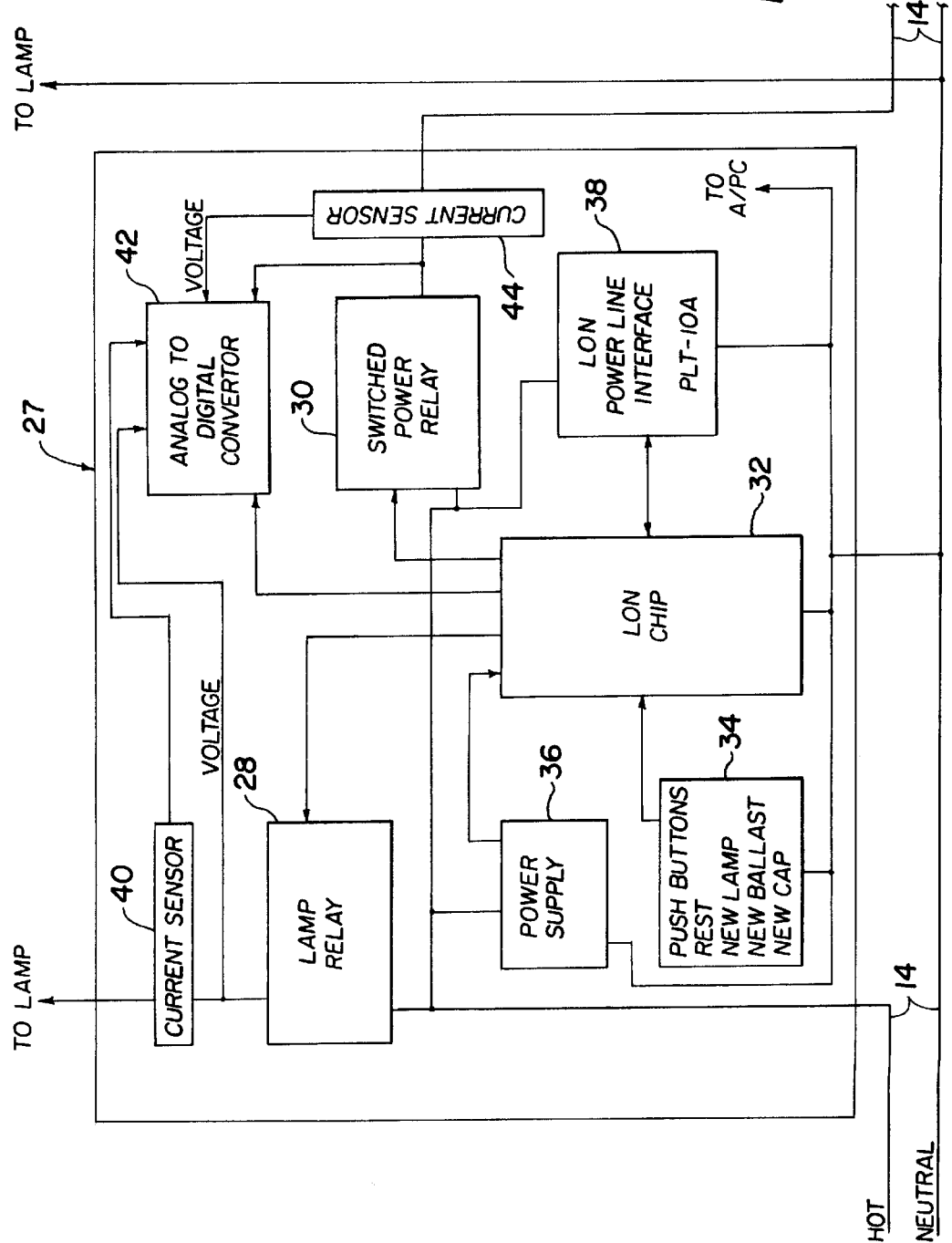
FIG. 3 is a more detailed block diagram of FIG. 2.
Figure 4:
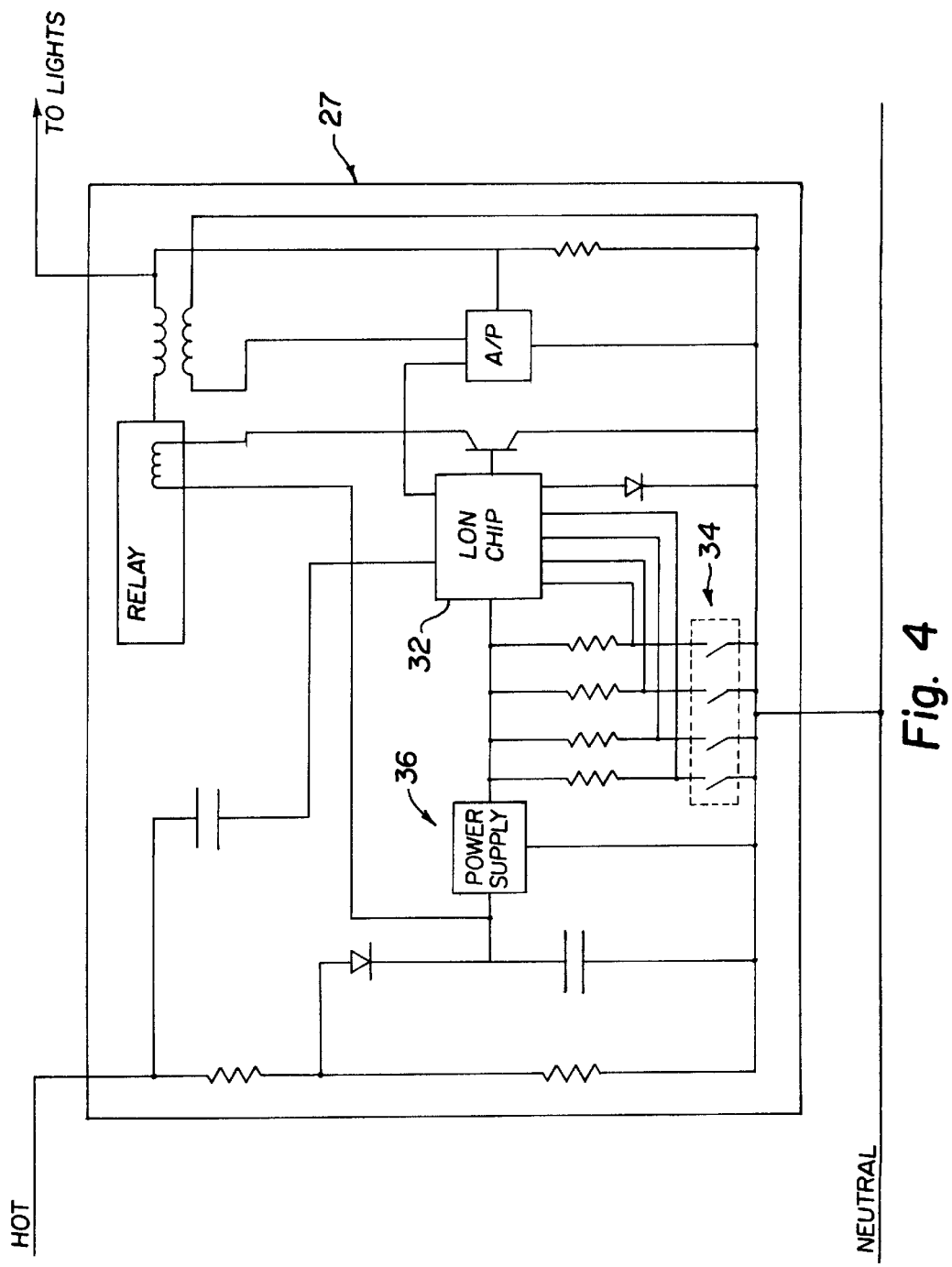
FIGS. 4 and 5 are still more detailed diagrams.

FIG. 3 shows further detail wherein each module 27 further comprises various switches 34 that are operated by service personnel at time of component replacement for inputting to the LON chip 32 signals to indicate replacement of various components, such as the lamp, or lamps, 12, the ballast, and the capacitor. Controller module 27 further comprises a power supply 36 that converts a small part of the incoming power to suitable voltage for operating other module components, particularly the LON chip 32. There is also a LON power line interface 38 that interfaces the LON chip with power lines 14. The lamp relay 28 and the switched power relay 30 are connected with the LON chip 32. Current flow to the pole's lamp(s) is monitored by a current sensor 40 which supplies a current measurement signal to an analog-to-digital converter 42. Lamp voltage is also supplied to the converter. Current leaving the controller module via the switched power relay 30 is monitored by a current sensor 44 that supplies a current measurement signal to converter 42, and the voltage from switched power relay 30 is supplied as a voltage signal to the converter.

The LON chip 32 is a device that provides certain functions at each pole. It turns the pole's lamp(s) on and off by operating the lamp relay 28 in accordance with commands received by module 27 via the incoming power lines 14. It turns power to the next pole in the string on and off by operating the switched power relay 30 in accordance with commands received by module 27 via the incoming power lines 14.

The LON chip 32 also provides data back to the control room 18 via the power lines 22 and lighting cabinets 16. This data includes lamp current, lamp voltage, and signals for indicating that a new ballast, a new capacitor, or new lamps have been installed. Communication between the LON chip 32 and power lines 14 is via interface 38.

At the central control station the usage of each lamp is logged so that a running count of hours on is maintained. Voltages and currents are also logged. Any unusual event that causes an alarm to be given is also logged. FIG. 7 is a chart describing various functions performed by a controller module 27 in a lamp pole 10, and functions performed by PC 26 at control station 18. Although the FIG. 6 shows the PC at the control station, the PC may be located elsewhere and connected via suitable means, including for example telemetry and/or modems, with the interface to the power lines 22. At a lighting cabinet 16, there may be conventional electrical equipment such as a transformer or transformers that couples the incoming power lines 22 to power lines 14 that serve the various strings of poles, various disconnects, etc. However, in certain installations, generally smaller installations, the equipment shown in control room 18 and the contents of a lighting cabinet may be contained at a single site.

The data collection and control capabilities of the inventive control system provide many possibilities for implementation in any installation. Once important purpose is to monitor for abnormal conditions, such as lamp, ballast, and capacitor failure (either actual or impending) at each individual pole. Another purpose is to schedule preventive maintenance. Another purpose is to monitor for line faults. The invention provides for communication between the control center and each individual pole. Each individual pole is uniquely identified and so the control center can communicate with the module 27 of each individual pole to ascertain its operating status and to collect information from the pole. If there is a failure or irregularity in a pole, the failure or irregularity is detected at the pole by the various sensing inputs to the LON chip 32, either directly from a sensor, such as a current sensor, or via interface 38. These are in turn communicated back via the power lines (and through any intervening lighting cabinet) to the control room. Personnel may or may not be in attendance at the control room. In event of emergency where no one is present, an alarm signal may be transmitted to a person's personal beeper to alert the person.

The communication of data and commands via the power lines themselves avoids the need for additional separate lines. The data and commands are transmitted digitally on the power lines at voltages and frequencies that can be correctly transmitted and received without interference between these signals and the power line voltage and current.

It is to be noted that power cannot be transmitted from one pole to a subsequent pole in a string unless switched power relay 30 in the one pole is actuated closed by the LON chip 32 in the one pole. The LON chip is programmed to prevent relay 30 actuation unless conditions at the one pole are within specification for proper operation. If there is a fault between the one pole and a subsequent pole, it can be detected because the relay 30 of the one pole will be actuated closed, but there will be no communication with the subsequent pole. This capability quickly provides the location of a fault so that service personnel can go directly to the location.

Figure 5:
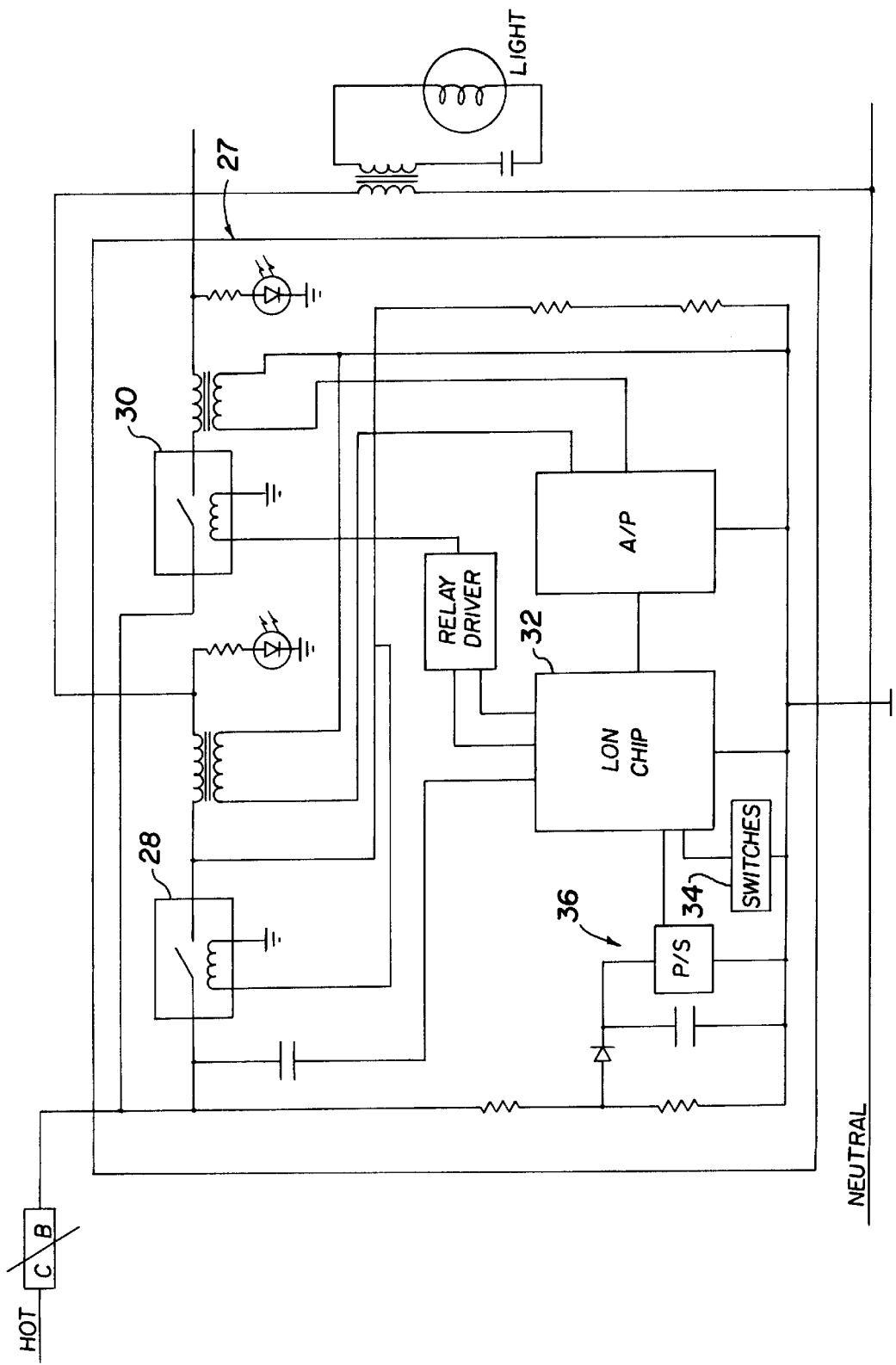

FIGS. 5 and 6 shows progressively greater detail of the circuitry of module 27. FIG. 6 shows the lamp, the capacitor, and the ballast connected in circuit with module 27. FIG. 5 shows the four individual switches connected to the LON chip 32 each of which is actuated when the corresponding component (lamp, ballast, capacitor) is replaced by a new one. This information is communicated to the control room to,begin logging new data for the new part or parts.

The LON chip 32 and interface 38 are conventional commercially available components. The LON chip and the PC are programmed by conventional programming procedures to perform the various functions that have been disclosed herein. A suitable LON chip is an Echelon Neuron Chip. The interface is also available from Echelon.

Figure 8:
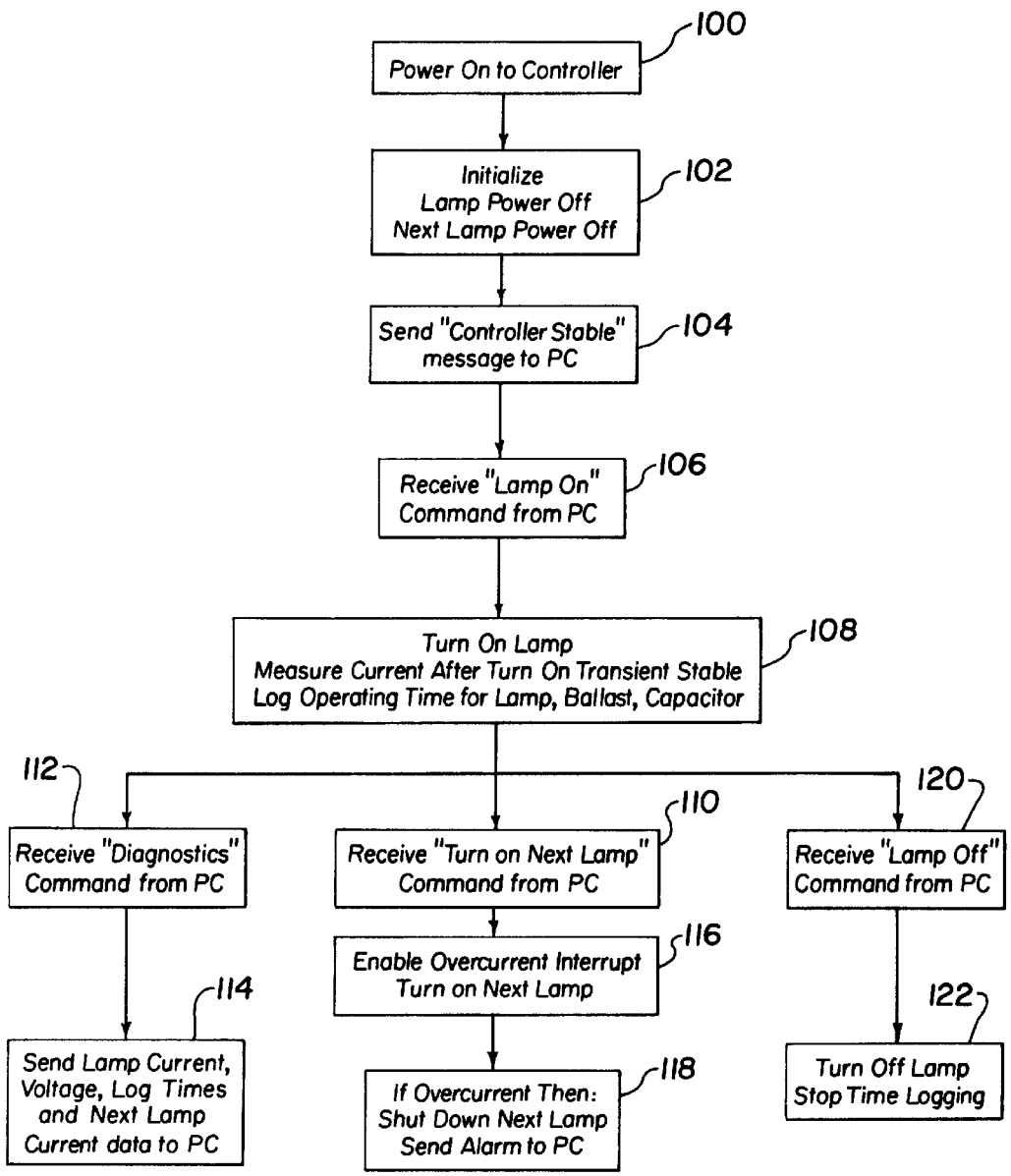
FIG. 8 is a block diagram of a control for executing functions.

The flow chart shown in FIG. 8 comprises the following steps for the controller. First, a power on step command 100 applies power to the first controller module 27. The delivery of power to that module serves to initialize it via its LON chip 32, as represented by step 102. Step 102 shows that the LON chip is placed in an initialized state that causes no power to be delivered to the lamp(s) of its pole or to the next module 27 in the string of modules. The LON chip then returns a "controller stable" signal to P.C. 26, represented by step 104, to indicate that the first controller module is ready to receive a "lamp on" command from the P.C.

Step 106 designates the "lamp on" command being given by the P.C. and received by the first controller module 27. That module responds to that command by its LON chip 32 commanding its lamp relay 28 to turn on the lamp(s) of its pole, as represented by step 108. When the lamp(s) are turned on, the lamp circuit will, if it is operating properly, execute a short electrical transient until the current and voltage stabilize. When steady state operation is detected, an appropriate signal or signals are returned from the LON chip 32 to the P.C. so that operating times for the lamp(s), ballast, and capacitor begin to be logged. Steady state operation can be detected by monitoring relevant current and/or voltage, or by waiting a sufficient amount of time for them to have stabilized if the circuit is operating properly. Step 108 shows that the current to the lamp(s) is measured after the transient period, and a signal representing that current is returned to the P.C. At the P.C. that signal is compared against proper current for that pole, and if the measured current is within the proper range, the operating times for the lamp(s), ballast, and capacitor begin to be logged. If the signal indicates an out-of-range current, a possible fault condition is logged for investigation and possible corrective action. These series of steps associated with the turning on the lamp(s) of the first pole occur quickly, and they further include a step of the LON chip 32 operating the switched power relay 30 to enable voltage to be transmitted to the next pole in the string, and communication to be established with the P.C.

The delivery of voltage to that next (second) pole in the string is followed by a "turn on next lamp" signal from the P.C. This is represented by the step 110 in FIG. 8. Upon receipt of that signal, the second pole's controller module 27 executes the same series of steps as described above for the first pole, although FIG. 8 does not contain blocks specifically repeating these steps. It is however to be understood that when the second pole's controller module receives its "turn on signal", it responds to that command by its LON chip 32 commanding its lamp relay 28 to turn on the lamp(s) of its pole. If it is operating properly, the lamp circuit will execute a short electrical transient until the current and voltage stabilize. When steady state operation is detected, an appropriate signal or signals are returned from the LON chip 32 to the P.C. so that operating times for the second pole's lamp(s), ballast, and capacitor begin to be logged. Steady state operation is detected as described above for the first pole, current to the lamp(s) is measured after the transient period, and a signal representing that current is returned to the P.C. At the P.C. that signal is compared against proper current for that pole, and if the measured current is within the proper range, the operating times for its lamp(s), ballast, and capacitor begin to be logged. If the signal indicates an out-of-range current, a possible fault condition is logged for investigation and possible corrective action. The turning on of the second pole's lamps is also accompanied by a step of its LON chip 32 operating its switched power relay 30 to enable voltage to be transmitted to the next (third) pole in the string, and communication of the third pole's controller module 27 to be established with the P.C.

Based on the foregoing description, it can be understood that this procedure continues along the entire string until the lamps of the last pole have been turned on. Any lamp circuit that is not operating properly will be logged. Operating times for each pole's components will be logged. Thus information and history regarding the operation of each pole is contained in the P.C., which may at times pass the information to a central station. Problems with the string of poles can be detected, and a particular pole having a problem can be identified.

Steps 112 and 114 show how a problem can be identified. If a potential problem is signaled from any pole, or at any time that it is desired to check one or more of the poles, a "diagnostics" command is issued from the P.C. to a controller module 27. Upon receipt of that command the commanded controller module 27 sends lamp current, voltage, log times, and next lamp current data back to the P.C. This is a reason why the exemplary current sensors 40 and 44 in each controller module 27 are important. Not only can the current flow into the lamps at each pole be sent to the P.C., but the current flow from a controller module 27 to the rest of the poles in the string can be ascertained. The P.C. is programmed with, or to calculate, what should be the proper currents and voltages at various points in each pole, including the lamp(s), ballast, capacitor, and controller module. Upon receiving data from the poles, each of which is uniquely identified, the P.C. can compare that data with the proper currents and voltages and thereby determine the location and nature of a fault or faults. This will greatly aid service personnel who must go out into the field to correct a problem.

The steps 116 and 118 depict a still further function that occurs in each controller module after it has been turned on. As the LON chip 32 operates the switched power relay 30 to deliver voltage to the next pole, it also enables an overcurrent interrupt. If the current flow to the next pole as sensed by sensor 44 is an overcurrent, the LON chip will immediately stop the operation of relay 30 so that power flow from its pole to the rest of the string is promptly terminated. A fault (alarm) signal is sent back to the P.C. to log the fault.

The remaining steps 120, 122 shown in FIG. 8 simply represent intentionally turning off the string of lamps. The P.C. issues a "lamp off" command, and when it is received the poles are shut down. This can be done in reverse order to "lamps on" so that each preceding pole in a string can supply final data to the P.C., if desired. Log off times are noted by the P.C. so that component "on" time ceases to accumulate.

The invention therefore adds important capabilities in monitoring and servicing a string of outdoor lamps. While a presently preferred embodiment has been illustrated and described, it is to be appreciated that principles are applicable to other embodiments that fall within the scope of the following claims.

What is claimed is:

1. An outdoor lighting control system for a string of outdoor illumination lamps disposed at various locations along an outdoor lighting system comprising:

for each of plural lamp locations in the string, a controller module comprising input means for receiving electric power input and output means for supplying electric power to the remainder of the string, each of said plural lamp locations further comprising one or more outdoor illumination lamps;

each controller module comprising a first switching means for switching the electric power input to deliver current to the one or more outdoor illumination lamps at the controller module's location, a second switching means for switching electric input power from the controller module's input means to the controller module's output means in response to receipt of electric power input at the controller module's input means, a electronic control unit for controlling the first switching means and the second switching means, and a first current sensing means for sensing current flowing through its first switching means and a second current sensing means for sensing current flowing through its second switching means.

2. An outdoor lighting control system as set forth in claim 1 in which the second current sensing means of each controller module is operatively connected to the controller module's electronic control unit, and the electronic control unit comprises means for causing the second switching means to interrupt flow of electric power from the output means when the second current sensing means senses a fault condition.

3. An outdoor lighting control system for a string of outdoor illumination lamps disposed at various locations along an outdoor lighting system comprising:

for each of plural lamp locations in the string, a controller module comprising input means for receiving electric power input and outout means for supplying electric power to the remainder of the string;

each of said plural lamp locations further comprising one or more outdoor illumination lamps;

each controller module comprising first switching means for switching the electric power input to deliver current to the one or more outdoor illumination lamps at the controller module's location, a second switching means for switching electric input power from the controller module's input means to the controller module's output means in response to receipt of electric power input at the controller module's input means, a electronic control unit for controlling the first switching means and the second switching means, in which said input means, said second switching means, and output means of the controller module at each of said plural locations form portions of a bi-directional data link between said plural locations.

4. An outdoor lighting control system as set forth in claim 3 further including a command station that controls said controller modules to operate the first switching means and the second switching means at each of said plural locations via the bi-directional data link.

5. An outdoor lighting control system as set forth in claim 4 in which the command station also controls the delivery of electric power to the string of outdoor illumination lamps via power lines from a power source to the input means of a first of said controller modules, and from the output means of the controller module at each of said plural locations to an input means of a succeeding controller module in the string.

6. An outdoor lighting control system as set forth in claim 5 in which the electric power lines form other portions of the bi-directional data link.

7. An outdoor lighting control system as set forth in claim 4 in which each of said plural lamp locations further comprises a capacitor and a ballast, and each controller module provides data concerning the outdoor illumination lamps, the capacitor, and the ballast at its location to the command station.

8. An outdoor lighting control system as set forth in claim 7 in which each of said plural locations comprises reset means that is operated by service personnel to send a signal to the command station to indicate that a component has been replaced, and the command station logs data concerning the replacement.

9. An outdoor lighting control system as set forth in claim 4 in which a lighting cabinet is disposed between the command station and the string.

\* \* \* \* \*